United States Patent
McDonough Migale (10) Patent No.: US 10,562,033 B2
(45) Date of Patent: Feb. 18, 2020

(54) SMOKING ACCESSORY ASSEMBLY

(71) Applicant: Danté McDonough Migale, Novato, CA (US)

(72) Inventor: Danté McDonough Migale, Novato, CA (US)

( * ) Notice: Subject to any disclaimer, the term of this patent is extended or adjusted under 35 U.S.C. 154(b) by 331 days.

(21) Appl. No.: 15/607,850

(22) Filed: May 30, 2017

(65) Prior Publication Data

US 2018/0344086 A1 Dec. 6, 2018

(51) Int. Cl.
*A47J 42/50* (2006.01)
*B02C 13/24* (2006.01)
*A24F 23/00* (2006.01)

(52) U.S. Cl.
CPC .............. *B02C 13/24* (2013.01); *A24F 23/00* (2013.01)

(58) Field of Classification Search
CPC .... B02C 7/02; B02C 7/04; B02C 7/08; B02C 7/11; B02C 13/22; B02C 13/24; A47J 42/12; A47J 42/14; A47J 42/24; A47J 42/40; A47J 42/50; A24C 5/40; A24C 5/42; A24C 5/425; A24F 17/00; A24F 23/00; A24F 27/00; A24F 27/02; A24B 7/00; A24B 7/04; A24B 7/06
USPC .... 241/83, 84, 85, 87.1, 101.01, 101.2, 168, 241/169.1, 188.1, 188.2, 244, 257.1, 241/273.1, 273.2, 273.3, 285.1, 285.2, 241/301
See application file for complete search history.

(56) References Cited

U.S. PATENT DOCUMENTS

| | | | | |
|---|---|---|---|---|
| 1,683,851 A * | 9/1928 | Wells | ............... | A45C 11/008 132/315 |
| 4,527,571 A * | 7/1985 | Djukic | ............... | A24F 1/00 131/178 |
| 4,832,057 A * | 5/1989 | Bale | ............... | A24C 5/40 131/329 |
| 5,848,596 A * | 12/1998 | Zelenik | ............... | A24F 23/04 131/329 |
| 6,616,075 B1 * | 9/2003 | Millerd | ............... | A47J 42/34 241/168 |
| 9,192,194 B2 * | 11/2015 | Fakhouri | ............... | A24F 9/16 |
| 9,814,259 B1 * | 11/2017 | Richmond | ............... | A24C 5/42 |
| 9,943,104 B1 * | 4/2018 | Simon | ............... | A24F 21/00 |
| 2014/0261471 A1 * | 9/2014 | Ruzycky | ............... | A24C 5/02 131/108 |
| 2016/0278430 A1 * | 9/2016 | Shalom | ............... | A24F 17/00 |
| 2017/0119043 A1 * | 5/2017 | Swanson | ............... | A24C 5/42 |
| 2017/0238601 A1 * | 8/2017 | Makboul | ............... | A24C 5/42 |
| 2017/0245541 A1 * | 8/2017 | Pagan | ............... | A47J 42/16 |

(Continued)

*Primary Examiner* — Shelley M Self
*Assistant Examiner* — Katie L. Parr (57) ABSTRACT

A smoking accessory assembly facilitates storing and transporting accessories for grinding smoking matter and rolling the smoking matter for smoking. The assembly includes a housing having a plurality of compartments. A grinder has a plurality of grinder teeth and a peripheral wall enclosing the grinder teeth. A plurality of cap teeth is coupled to and extends from a top cap. The grinder is insertable into the top cap for grinding plant matter. A funnel tapers away to a tube section extending from a base of the funnel. Openings extend through the grinder for passing ground plant matter through the funnel and into the tube section. The tube section is open for passing the ground plant matter into a rolling paper wrapped around the tube section.

16 Claims, 5 Drawing Sheets

(56) References Cited

U.S. PATENT DOCUMENTS

2017/0332697 A1* 11/2017 Roberto, Jr. .............. A24F 9/16
2018/0332892 A1* 11/2018 Beaver .................... A24F 15/18

* cited by examiner

SMOKING ACCESSORY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to smoking accessory devices and more particularly pertains to a new smoking accessory device for storing and transporting everything needed for grinding smoking matter and rolling the smoking matter for smoking.

BRIEF SUMMARY OF THE INVENTION

An embodiment of the disclosure meets the needs presented above by generally comprising a housing having a plurality of compartments. A grinder has a plurality of grinder teeth and a peripheral wall enclosing the grinder teeth. A plurality of cap teeth is coupled to and extends from a top cap. The grinder is insertable into the top cap for grinding plant matter. A funnel tapers away to a tube section extending from a base of the funnel. Openings extend through the grinder for passing ground plant matter through the funnel and into the tube section. The tube section is open for passing the ground plant matter into a rolling paper wrapped around the tube section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new smoking accessory device embodying the principles and concepts of an embodiment of the disclosure and generally designated by the reference numeral 10 will be described.

As best illustrated in FIGS. 1 through 6, the smoking accessory assembly 10 generally comprises a housing 12 having a plurality of compartments 14. The housing 12 has a top 16 and a bottom 18. The plurality of compartments 14 includes a paper storage compartment 20 extending into the top 16 of the housing 12. The plurality of compartments 14 includes a filter storage compartment 22 extending into the top 16 of the housing 12. The housing 12 includes a grinder storage compartment 24. The plurality of compartments 14 also includes a plant matter storage compartment 26 extending into the bottom 18 of the housing 12. Additional compartments 28 may be provided for storage of matches, eye drops, a lighter, or other accessories conventionally used in association with smoking.

A grinder 30 has a first end 32. Each of a plurality of grinder teeth 34 is coupled to and extends from the first end 32 of the grinder 30. A peripheral wall 36 is coupled to the grinder 30. The peripheral wall 36 extends around the first end 32 enclosing the grinder teeth 34. The grinder 30 includes a funnel 38 tapering away from the first end 32 and a tube section 40 extending from a base 42 of the funnel 38. The tube section 40 is transparent allowing a person to see contents within the tube section 40. The grinder 30 is positionable in the grinder storage compartment 24 by insertion of the tube section 40 into the grinder storage compartment 24.

A top cap 44 is couplable to the housing 12 such that the top cap 44 covers the top 16 of the housing 12. The top cap 44 has a top wall 46 and a perimeter wall 48 coupled to and extending from the top wall 46 surrounding a bottom surface 50 of the top wall 46. Each of a plurality of cap teeth 52 is coupled to and extends from the bottom surface 50 of the top wall 46. The first end 32 of the grinder 30 is insertable into the top cap 44 wherein the grinder teeth 34 and the cap teeth 52 are configured for grinding plant matter 54 positioned in the top cap 44 by rotation of the top cap 44 relative to the grinder 30. Each of a plurality of openings 56 extends through the first end 32 of the grinder 30 wherein the first end 32 is configured for the cap teeth 52 to push ground plant matter 54 through the openings 56 and into the funnel 38. The funnel 38 directs the ground plant matter 54 into the tube section 40. The tube section 40 is open at a second end 58 of the grinder 30 wherein the tube section 40 is configured for passing the ground plant matter 54 into a rolling paper wrapped around the tube section 40.

Figure 1:
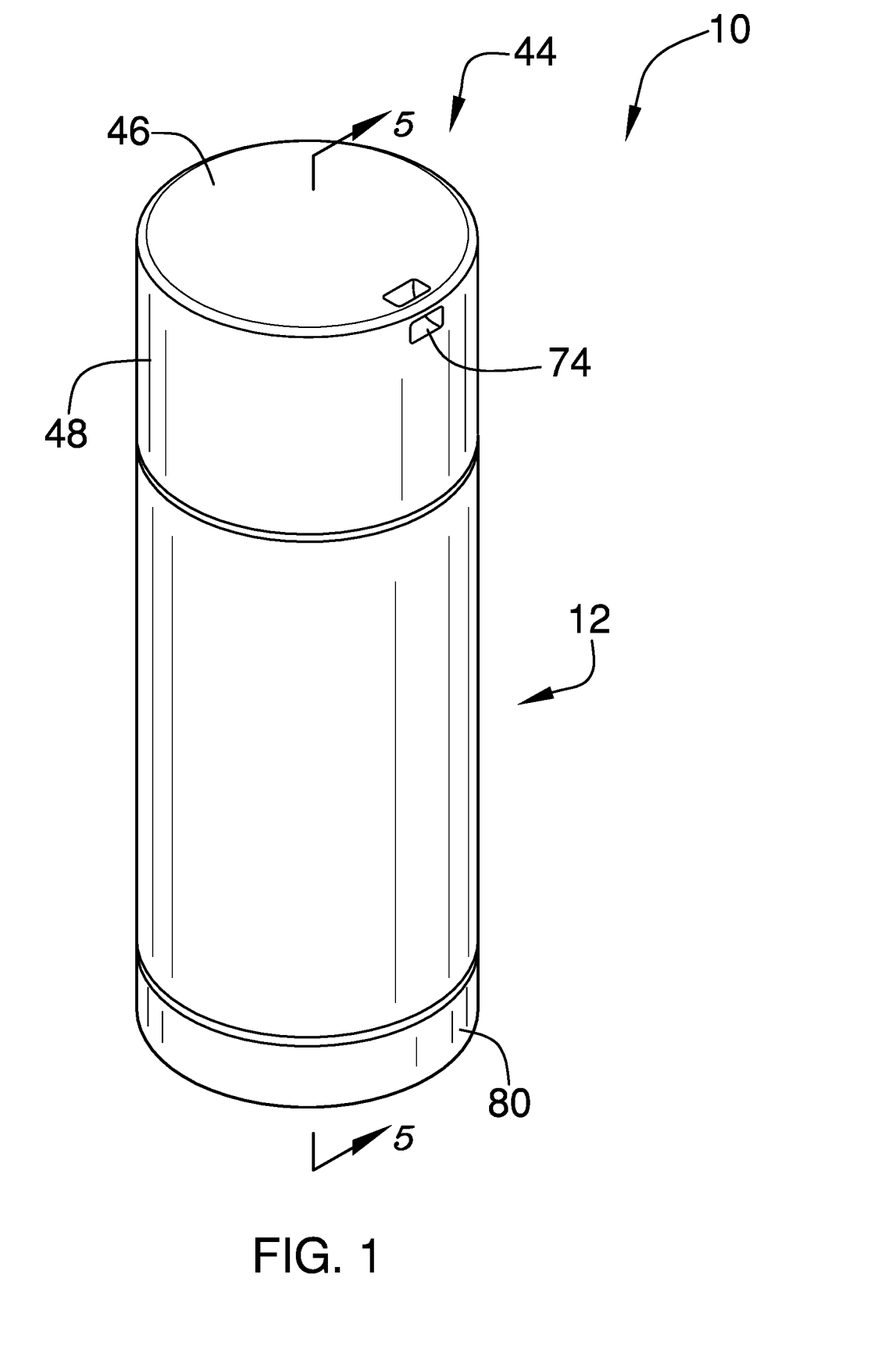
FIG. 1 is a top front side perspective view of a smoking accessory assembly according to an embodiment of the disclosure.
Figure 2:
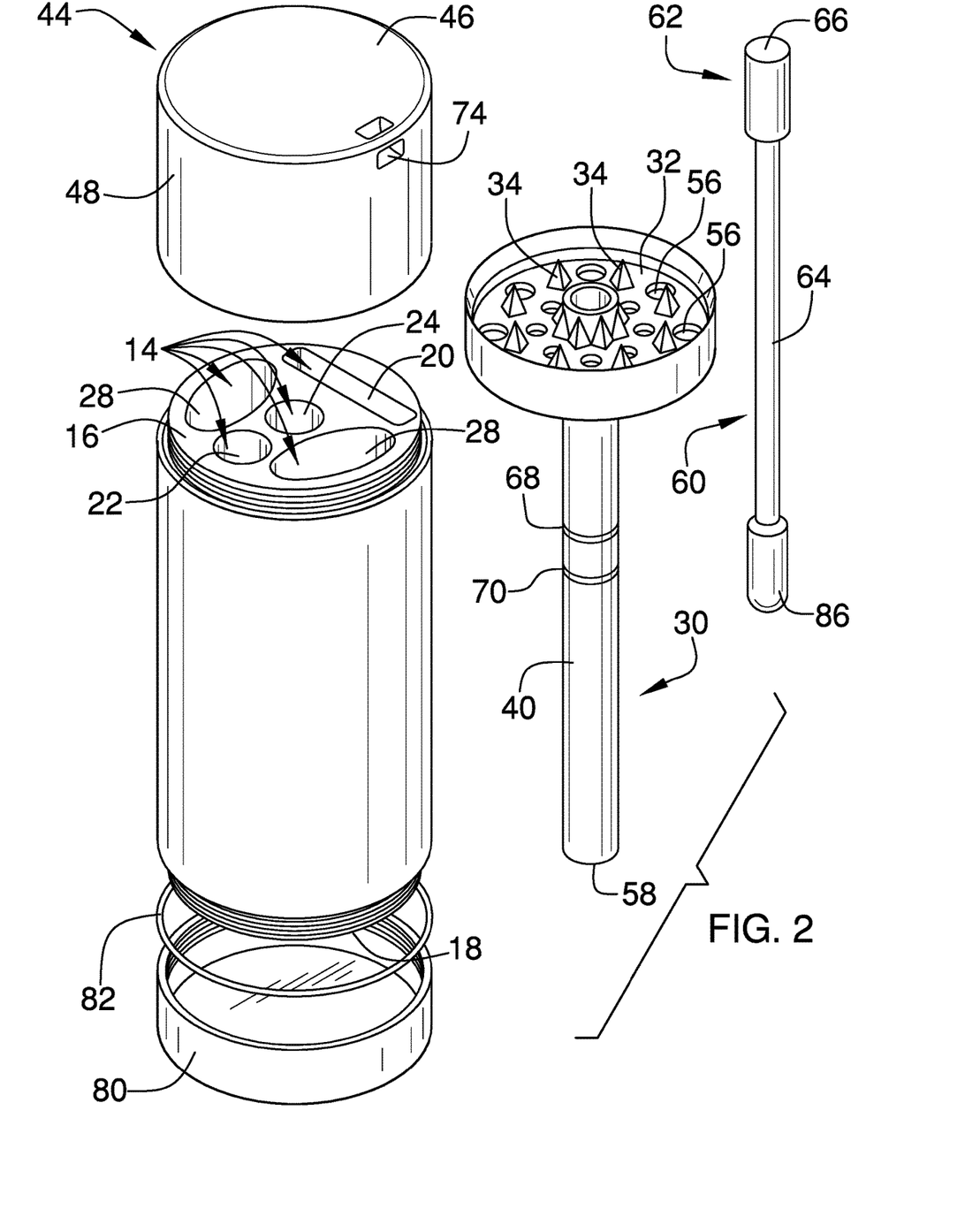
FIG. 2 is an exploded top front side perspective view of an embodiment of the disclosure.
Figure 3:
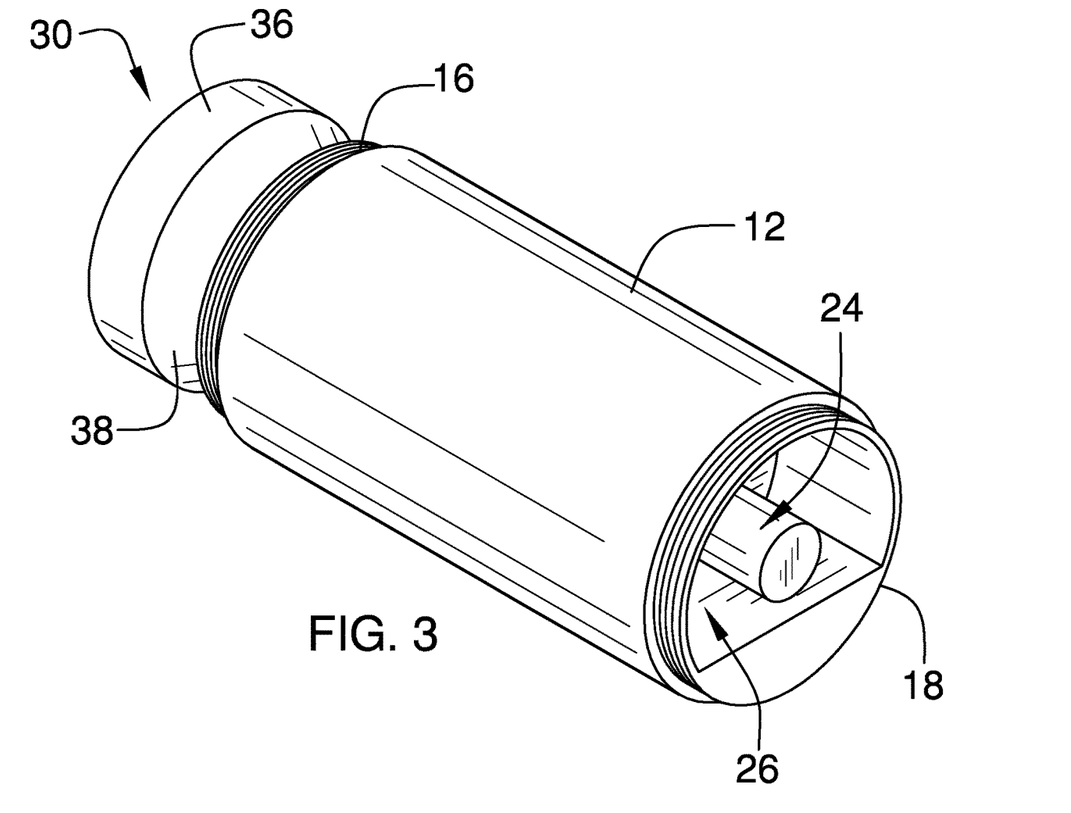
FIG. 3 is a partially exploded bottom front side perspective view of an embodiment of the disclosure.
Figure 4:
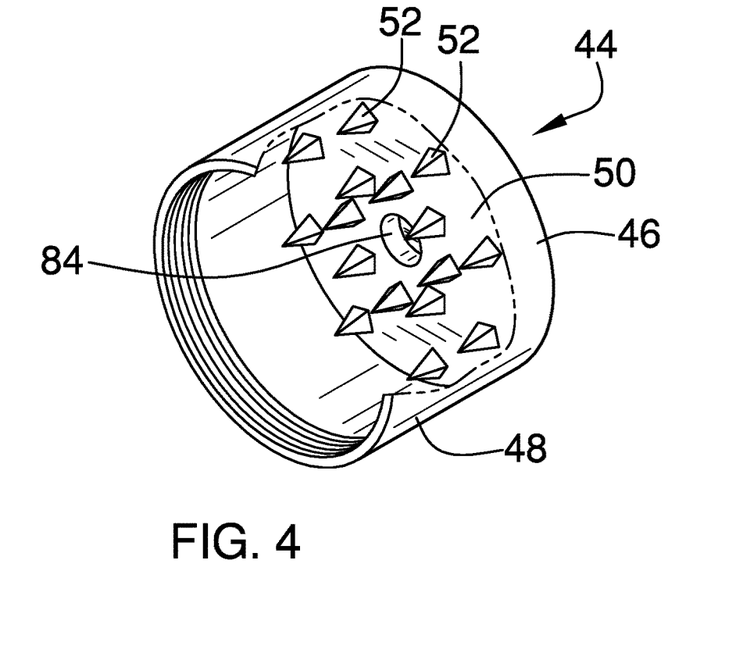
FIG. 4 is a partial cut-away bottom front side view of a top cap of an embodiment of the disclosure.
Figure 5:
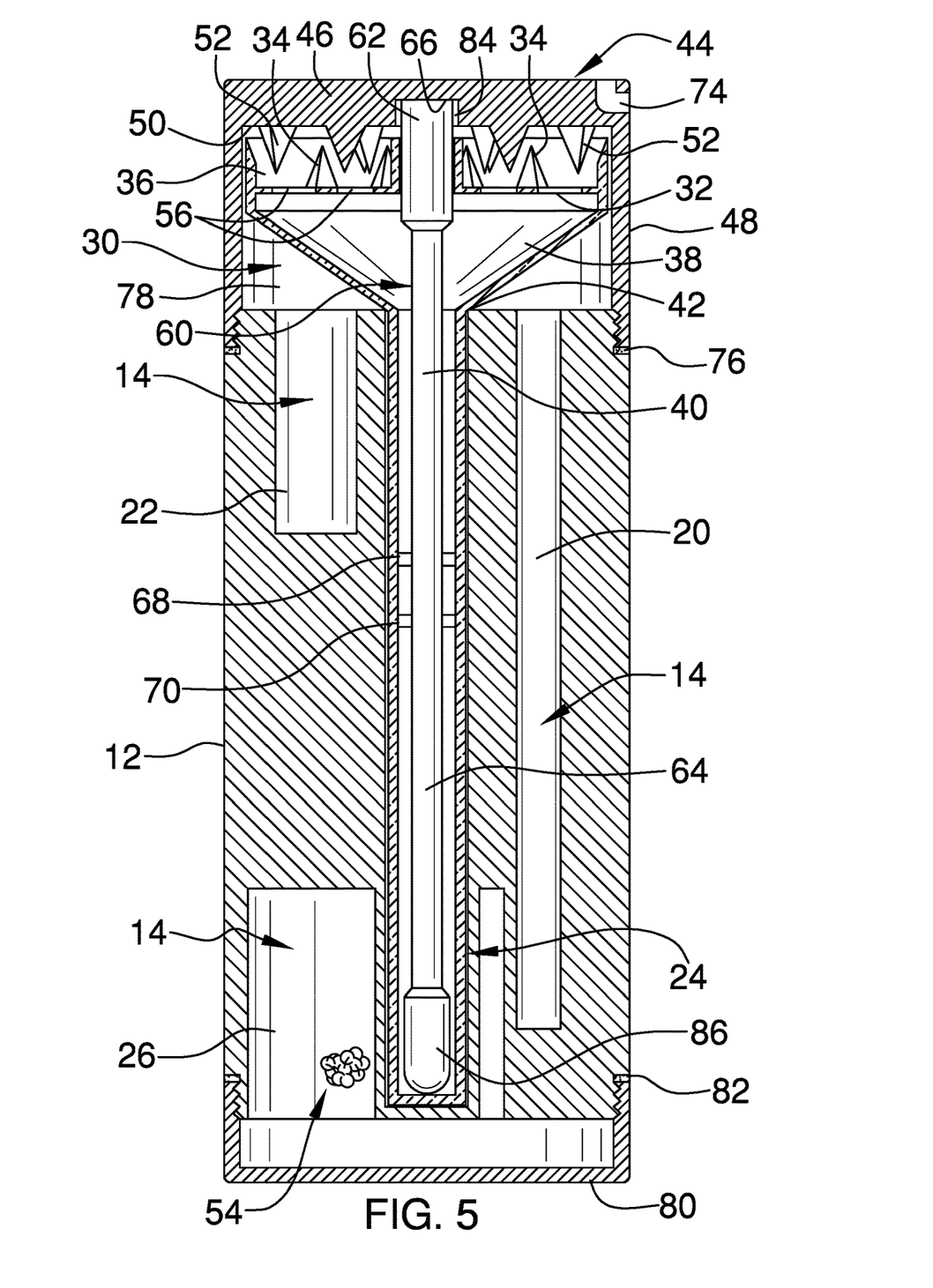
FIG. 5 is a cross-sectional view of an embodiment of the disclosure taken along line 5-5 of FIG. 1.
Figure 6:
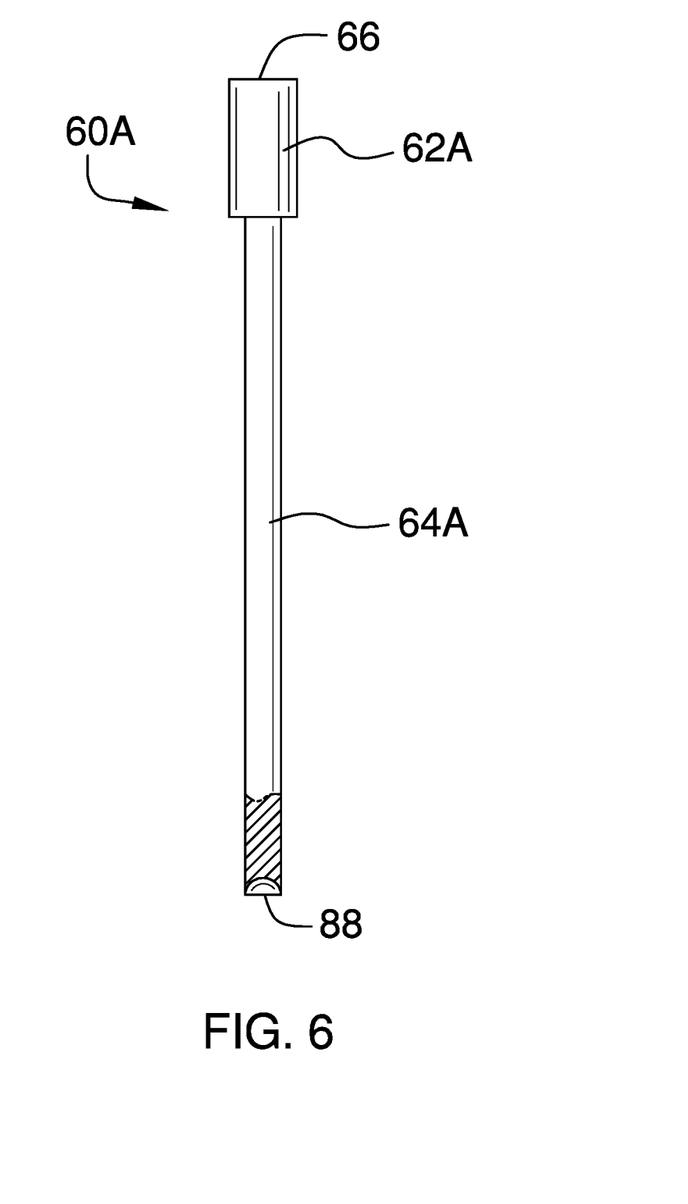
FIG. 6 is a partial cut-away front view of alternative embodiment of the compacting rod.

A compacting rod 60 has a head 62 and a shaft 64. The head 62 has a diameter complementary to a diameter of the tube section 40 wherein the compacting rod 60 is configured for compacting the ground plant matter 54 into the rolling paper. The head 62 is cylindrical having a flat surface 66 perpendicular to a longitudinal axis of the shaft 64. A tail 86 may be coupled to the shaft 64 opposite the head 62. The tail 86 has a rounded end facing away from the shaft 64 and also has a diameter complementary to the diameter of the tube section 40. FIG. 6 shows an alternative compacting rod 60A. The alternative compacting rod 60A includes a head 62A having similar structure to head 62. The alternative compacting rod 60A has a shaft 64A having a distal end 88 relative to the head 62A. The distal end 88 of the shaft 64A is concave as shown in FIG. 6. A recess 84 is provided in the top cap 44 to allow for the compacting rod 60 to fit within the housing 12 while the top cap 44 is engaged to the housing 12.

A first guide line 68 extends circumferentially around the tube section 40. The first guide line 68 is spaced from the second end 58 of the grinder 30 wherein the first guide line 68 is configured for indicating where to align the rolling paper such that the rolling paper extends a desired amount beyond the second end 58 of the grinder 30 to allow for closing of the rolling paper. A second guide line 70 extends circumferentially around the tube section 40 in spaced relationship to the first guide line 68. The second guide line 70 is positioned between the first guide line 68 and the second end 58 of the grinder 30. The second guide line 70 is positioned closer to the first guide line 68 than the second end 58 of the grinder 30. The second guide line 70 is spaced from the first guide line 68 a distance corresponding to the length of a glass filter or crutch, which may be between 0.5 and 1.5 centimeters. Combined with transparency or sufficient translucence of the tube section 40, the second guide line 70 provides a visible indicator, or fill line, showing how much ground plant matter 54 to introduce into the tube section 40. When the rolling paper is removed from the tube section 40 with the ground plant matter 54, the remaining gap is sized to receive the glass filter or crutch.

A channel 74 extends through the top cap 44 wherein the top cap 44 is configured for being coupled to an extrinsic object such as a key chain, or the like, by a tether. The tether may be a strap, chain, ring, wire, or the like. The channel 74 is fully enclosed by the top wall 46 of the top cap 44 such that the channel 74 is not in environmental communication with an enclosure 78 formed by coupling the top cap 44 to the housing 12. A top seal 76 may be provided to inhibit environmental communication between the enclosure 78 and ambient air around the housing 12. The top seal 76 may be an O-ring of conventional design to prevent water or moisture from entering the enclosure 78 and preventing odor from emanating from the enclosure 78.

A bottom cap 80 is selectively couplable to the bottom 18 of the housing 12 wherein the bottom cap 80 encloses the plant matter storage compartment 26. The plant matter storage compartment 26 is isolated from the other compartments 14 by being the sole compartment 14 positioned on the bottom 18 of the housing 12. This minimizes exposure to ambient air to preserve the plant matter being stored. A bottom seal 82 is positioned between the bottom cap 80 and the housing 12 wherein the plant matter storage compartment 26 is sealed from the ambient air when the bottom cap 80 is coupled to the housing 12. Similar to the top seal 76, the bottom seal 82 may also be an O-ring of conventional design preventing water or moisture from entering the plant matter storage compartment 26 and preventing odor from emanating from the plant matter storage compartment 26.

In use, the filter storage compartment 22 and the paper storage compartment 20 are used in an expected manner for storage of these conventional smoking accessories. A desired amount of the plant matter 54 stored in the plant matter storage compartment 26 is placed into the top cap 44 while the top cap 44 is in an inverted position to contain the plant matter 54. The grinder 30 is then used to grind the plant matter 54 in the top cap 44. The grinder 30 and top cap 44 may be turned over such that the ground plant matter 54 may pass through into the funnel 38 and through the tube section 40 into a prepared rolling paper on the tube section 40 as previously described. The compacting rod 60 is used to tamp the ground plant matter 54 into the prepared rolling paper. When filled as desired, the rolling paper is removed from the tube section 40 and any additional conventional preparations prior to smoking may be performed such as introduction of a filter, or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smoking accessory assembly comprising:
a housing having a plurality of compartments, said housing having a top and a bottom;
a grinder having a first end, a plurality of grinder teeth coupled to and extending from said first end of said grinder, a peripheral wall coupled to said grinder, said peripheral wall extending around said first end enclosing said grinder teeth;
a top cap couplable to said housing such that said top cap covers said top of said housing, said top cap having a top wall and a perimeter wall coupled to and extending from said top wall surrounding a bottom surface of said top wall;

a plurality of cap teeth coupled to and extending from said bottom surface of said top wall, said first end of said grinder being insertable into said top cap wherein said grinder teeth and said cap teeth are configured for grinding plant matter positioned in said top cap by rotation of said top cap relative to said grinder;

said grinder including a funnel tapering away from said first end and a tube section extending from a base of said funnel;

a plurality of openings extending through said first end of said grinder wherein said first end is configured for passing ground plant matter through said funnel and into said tube section;

said tube section being open at a second end of said grinder wherein said tube section is configured for passing the ground plant matter into a rolling paper wrapped around said tube section, said tube section being transparent; and a first guide line extending around said tube section, said first guide line being spaced from said second end of said grinder wherein said first guide line is configured for indicating where to align the rolling paper such that said rolling paper extends between said first guide line and said second end of said grinder.

2. The assembly of claim 1, further comprising said housing including a grinder storage compartment, said grinder being positionable in said grinder storage compartment.

3. The assembly of claim 1, further comprising a compacting rod, said compacting rod having a head and a shaft, said head having a diameter complementary to a diameter of said tube section wherein said compacting rod is configured for compacting the ground plant matter into the rolling paper.

4. The assembly of claim 3, further comprising said head being cylindrical having a flat surface perpendicular to a longitudinal axis of said shaft.

5. The assembly of claim 4, further comprising a tail coupled to said shaft opposite said head, said tail having a rounded end facing away from said shaft.

6. The assembly of claim 1, further comprising a second guide line extending around said tube section, said second guide line being positioned between said first guide line and said second end of said grinder.

7. The assembly of claim 6, further comprising said second guide line being positioned closer to said first guide line than said second end of said grinder.

8. The assembly of claim 6, further comprising said second guide line being spaced a distance between 0.5 and 1.5 centimeters from said first guide line.

9. The assembly of claim 1, further comprising a channel extending through said top cap wherein said top cap is configured for being coupled to an extrinsic object by a tether.

10. The assembly of claim 9, further comprising said channel being fully enclosed by said top wall of said top cap.

11. The assembly of claim 1, further comprising:
said plurality of compartments including a plant matter storage compartment extending into the bottom of said housing; and
a bottom cap, said bottom cap being selectively couplable to said bottom of said housing wherein said bottom cap encloses said plant matter storage compartment.

12. The assembly of claim 11, further comprising a bottom seal positioned between said bottom cap and said housing wherein said plant matter storage compartment is sealed when said bottom cap is coupled to said housing.

13. The assembly of claim 1, further comprising said plurality of compartments including a paper storage compartment extending into said top of said housing.

14. The assembly of claim 1, further comprising said plurality of compartments including a filter storage compartment extending into said top of said housing.

15. A smoking accessory assembly comprising:
a housing having a plurality of compartments, said housing having a top and a bottom, said plurality of compartments including a paper storage compartment extending into said top of said housing, said plurality of compartments including a filter storage compartment extending into said top of said housing, said housing including a grinder storage compartment, said plurality of compartments including a plant matter storage compartment extending into the bottom of said housing;

a grinder having a first end, a plurality of grinder teeth coupled to and extending from said first end of said grinder, a peripheral wall coupled to said grinder, said peripheral wall extending around said first end enclosing said grinder teeth, said grinder being positionable in said grinder storage compartment, said grinder including a funnel tapering away from said first end and a tube section extending from a base of said funnel, said tube section being transparent;

a top cap couplable to said housing such that said top cap covers said top of said housing, said top cap having a top wall and a perimeter wall coupled to and extending from said top wall surrounding a bottom surface of said top wall;

a plurality of cap teeth coupled to and extending from said bottom surface of said top wall, said first end of said grinder being insertable into said top cap wherein said grinder teeth and said cap teeth are configured for grinding plant matter positioned in said top cap by rotation of said top cap relative to said grinder;

a plurality of openings extending through said first end of said grinder wherein said first end is configured for passing ground plant matter through said funnel and into said tube section; and said tube section being open at a second end of said grinder wherein said tube section is configured for passing the ground plant matter into a rolling paper wrapped around said tube section;

a compacting rod, said compacting rod having a head and a shaft, said head having a diameter complementary to a diameter of said tube section wherein said compacting rod is configured for compacting the ground plant matter into the rolling paper, said head being cylindrical having a flat surface perpendicular to a longitudinal axis of said shaft;

a tail coupled to said shaft opposite said head, said tail having a rounded end facing away from said shaft;

a first guide line extending around said tube section, said first guide line being spaced from said second end of said grinder wherein said first guide line is configured for indicating where to align the rolling paper such that said rolling paper extends between said first guide line and said second end of said grinder;

a second guide line extending around said tube section, said second guide line being positioned between said first guide line and said second end of said grinder, said second guide line being positioned closer to said first guide line than said second end of said grinder, said second guide line being spaced a distance between 0.5 and 1.5 centimeters from said first guide line;

a channel extending through said top cap wherein said top cap is configured for being coupled to an extrinsic object by a tether, said channel being fully enclosed by said top wall of said top cap;

a bottom cap, said bottom cap being selectively couplable to said bottom of said housing wherein said bottom cap encloses said plant matter storage compartment; and a bottom seal positioned between said bottom cap and said housing wherein said plant matter storage compartment is sealed when said bottom cap is coupled to said housing.

16. A smoking accessory assembly comprising:

a housing having a plurality of compartments, said housing having a top and a bottom, said plurality of compartments including a paper storage compartment extending into said top of said housing, said plurality of compartments including a filter storage compartment extending into said top of said housing, said housing including a grinder storage compartment, said plurality of compartments including a plant matter storage compartment extending into the bottom of said housing;

a grinder having a first end, a plurality of grinder teeth coupled to and extending from said first end of said grinder, a peripheral wall coupled to said grinder, said peripheral wall extending around said first end enclosing said grinder teeth, said grinder being positionable in said grinder storage compartment, said grinder including a funnel tapering away from said first end and a tube section extending from a base of said funnel, said tube section being transparent;

a top cap couplable to said housing such that said top cap covers said top of said housing, said top cap having a top wall and a perimeter wall coupled to and extending from said top wall surrounding a bottom surface of said top wall;

a plurality of cap teeth coupled to and extending from said bottom surface of said top wall, said first end of said grinder being insertable into said top cap wherein said grinder teeth and said cap teeth are configured for grinding plant matter positioned in said top cap by rotation of said top cap relative to said grinder;

a plurality of openings extending through said first end of said grinder wherein said first end is configured for passing ground plant matter through said funnel and into said tube section; and said tube section being open at a second end of said grinder wherein said tube section is configured for passing the ground plant matter into a rolling paper wrapped around said tube section;

a compacting rod, said compacting rod having a head and a shaft, said head having a diameter complementary to a diameter of said tube section wherein said compacting rod is configured for compacting the ground plant matter into the rolling paper, said head being cylindrical having a flat surface perpendicular to a longitudinal axis of said shaft, a distal end of said shaft relative to said head being concave;

a first guide line extending around said tube section, said first guide line being spaced from said second end of said grinder wherein said first guide line is configured for indicating where to align the rolling paper such that said rolling paper extends between said first guide line and said second end of said grinder;

a second guide line extending around said tube section, said second guide line being positioned between said first guide line and said second end of said grinder, said second guide line being positioned closer to said first guide line than said second end of said grinder, said second guide line being spaced a distance between 0.5 and 1.5 centimeters from said first guide line;

a channel extending through said top cap wherein said top cap is configured for being coupled to an extrinsic object by a tether, said channel being fully enclosed by said top wall of said top cap;

a bottom cap, said bottom cap being selectively couplable to said bottom of said housing wherein said bottom cap encloses said plant matter storage compartment; and a bottom seal positioned between said bottom cap and said housing wherein said plant matter storage compartment is sealed when said bottom cap is coupled to said housing.

* * * * *